United States Patent [19]
Cochrane

[11] Patent Number: 4,632,265
[45] Date of Patent: Dec. 30, 1986

[54] PRESS-ON CAP AND SEAL

[76] Inventor: Benjamin A. Cochrane, 181 Sonora Ave., Danville, Calif. 94526

[21] Appl. No.: 709,534

[22] Filed: Mar. 8, 1985

Related U.S. Application Data

[63] Continuation-in-part of Ser. No. 507,342, Jun. 24, 1983, abandoned.

[51] Int. Cl.$^4$ .............................................. B65D 41/48
[52] U.S. Cl. .................................... 215/232; 215/256; 215/347; 215/348
[58] Field of Search ............... 215/232, 256, 258, 347, 215/348; 220/270, 268

[56] References Cited

U.S. PATENT DOCUMENTS

| | | | |
|---|---|---|---|
| 2,389,761 | 11/1945 | Burgeni | 215/348 |
| 2,937,481 | 5/1960 | Palmer | 215/347 X |
| 3,786,954 | 1/1974 | Shull | 215/348 X |
| 3,861,549 | 1/1975 | Watson et al. | 215/232 |
| 3,920,503 | 11/1975 | Keeler | 215/258 X |
| 4,032,029 | 6/1977 | Cochrane | 215/256 |
| 4,387,818 | 6/1983 | Conti | 215/256 |
| 4,437,593 | 3/1984 | Bullock | 215/256 |

*Primary Examiner*—Donald F. Norton
*Attorney, Agent, or Firm*—Plante, Strauss & Vanderburgh

[57] ABSTRACT

An improved press-on bottle cap is disclosed in which the cap comprises a top disk and a thin-walled outer skirt dependent therefrom with an annular tear band which, when separated from the cap, divides the cap into a lower ring and an upper reclosure cap. An annular lip is provided about the outside wall of the cap, approximately in the middle of the reclosure cap and the tear tab, which is integral with the tear band, extends upwardly into contact with the underside of the annular lip. Preferably, the lip is discontinuous with an open sector above the tear tab, and the cap is fabricated without the necessity to use a split-cavity mold, and a preferred mold construction is also disclosed. A compressible, plastic foam gasket is employed in the cap to seal the container contents. A foam gasket is seated on the undersurface of the cap in a position to bear against the upper end of the neck of the container which is received in the cap. The tear band is formed by two circumferential score lines in the cap skirt which also has two circumferential beads about its inner wall which fit into grooves of the neck finish of the container. The cap is positively tamper-proof in that either the gasket or the lower portion of the outer skirt can be sealed to the bottle neck.

23 Claims, 12 Drawing Figures

PRESS-ON CAP AND SEAL

RELATION TO OTHER APPLICATIONS

This application is a continuation-in-part of my co-pending application, Ser. No. 507,342, filed on June 24, 1983, now abandoned.

BACKGROUND OF THE INVENTION

1. Field of the Invention

This invention relates to an improved bottle cap and, in particular, to an improved cap having an annular tear band and tab which can be molded without a split-cavity mold, to a mold for its manufacture, and to a method for its use.

2. Brief Statement of the Prior Art

Plastic caps for narrow-necked bottles and containers such as the ubiquitous dairy plastic container are typically of press-on or screw type. The press-on caps used heretofore have an inner or corking skirt dependent from the underside of the top disc of the cap. This corking skirt is received within the neck of the container and the cap is secured about the neck which is thus received between its inner, corking skirt and the outer capping skirt. The outer skirt commonly bears two annular ribs or beads about its inner periphery axially positioned to be received in annular grooves in the neck finish of the container, and has two parallel score lines between the two annular beads to form a tear band. The tear band construction and upper and lower annular beads has been claimed by its manufacturers as "tamper-proof". The tamper-proof objective, however, has not been achieved. Most press-on caps can be removed without removing the tear bands, with varying difficulty, depending on the design. This shortcoming is inherent in their design, since the caps must be sufficiently elastic to stretch and permit the annular beads to seat in the annular grooves of the bottle neck during the capping operation. A simple application of a sufficient unseating force will remove the entire cap, which when reseated, offers no clue that the container was previously opened. Recent events in the pharmaceutical industry have underscored the necessity for more secure closures, i.e., for a truly tamper-proof closure, which can also be applied to the dairy, drink and food industries.

Another difficulty commonly experienced with the press-on caps is the lack of precise tolerance in the manufacture of the caps and/or the neck finish of the plastic container. The plastic containers are blow-molded and the neck finish is achieved with dies commonly referred to as shear steel and neck rings. With frequent or prolonged use, the closure tolerances of these dies can be lost with the result that the thicknesses of the neck wall can vary significantly from the original specifications. Furthermore, lack of precise control in manufacturing of the caps frequently results in caps in which the tolerances are not carefully controlled. Difficulties are experienced in the capping operations from both of these causes, and are aggravated by the trend to very light-weight plastic dairy containers, such as the 50-gram gallon container. To illustrate, flashing is trimmed from the neck of the containers during their manufacture and, sometimes, this trimming is imperfect so that necks are obtained which are not perfectly in round or in which the flashing is not completely removed. The result of these fabrication errors is that the container neck frequently wedges between the inner and outer skirts of the cap, lifting the cap or preventing the cap from securely seating.

Another difficulty which is experienced with the center corking skirt of the conventional press-on cap is that the lack of flexibility of the corking skirt prevents its use for capping of glass bottles because of the lack of precise tolerances in neck thicknesses of glass bottles.

While the center, corking skirt was envisioned as sealing the caps on the containers such as blow-molded diary containers and the like, in practice, little or no sealing is actually effected by this corking skirt. Furthermore, the edge of the container that bears against the corking skirt is very narrow and no significant sealing surface is presented, even under ideal manufacturing conditions. In practice, the variations in tolerances of the cap and/or molded plastic bottle prevent even minimal sealing between these members. As a result, the sought-after sealing of caps in containers such as plastic dairy bottles has not ben achieved with press-on caps.

Manufacturers of press-on caps have also avoided split-cavity molds because of their greater complexity and cost. Consequently, the tab on the tear band of the cap of one manufacturer is formed on the lower edge of the cap skirts, resulting in a spiral tear band, as in U.S. Pat. No. 3,338,446. Caps of this design, however, are prone to split during the capping operation. Other manufacturers have avoided the splitting problem with entirely annular tear bands having lateral tear tabs however, this cap does not have an annular lip on its reclosure cap, and for this reason in inconvenient to the consumer. In my prior patents, U.S. Pat. No. 4,032,029, I disclosed a cap with an annular tear band and tab, and an annular lip. While this cap was a substantial improvement over the aforementioned caps, its manufacturing required the use of a split cavity mold, and it also utilized the less than ideal center corking skirt.

BRIEF DESCRIPTION OF THE INVENTION

This invention comprises a press-on dairy cap having an annular tear band with a lateral tear tab and a annular lip on its reclosure cap, all located in sufficient proximity to permit its manufacture without using a split-cavity mold. Preferably the cap incorporates a thin compressible plastic foam sealing member. The sealing member is in the form of a disk or gasket which is received beneath undersurface of the cap.

The cap of the invention comprises a top disk and a single downwardly dependent skirt. The skirt is a thin-walled skirt which is integrally attached to the disk and extends perpendicularly thereto. The skirt is scored and weakened along first and second, spaced-apart circumferential score lines, downwardly spaced from the disk, thereby forming a weakened tear band about the skirt, which divides the cap into a lower ring and a reclosure cap. An annular lip is formed near the lower edge of the reclosure cap and a tear tab is attached to the tear band and extends outwardly from the outer skirt, preferably radially outwardly. A tear tab is attached to the tear band and extends outwardly from the outer skirt, preferably radially outwardly, and upwardly into integral contact with the annular lip. The latter is discontinuous with an open sector immediately above the tear tab, resulting in a cap which can be molded without a split-cavity mold.

To retain the cap against the container neck, compressing the upper edge of the container neck against the compressible foam gasket, two narrow radial beads are provided which extend circumferentially about the inside of the skirt. These beads are integrally attached to the skirt. Preferably, one bead is positioned above the tear and a second bead is positioned below the band.

The lowermost skirt portion of the cap can be permanently bonded to the neck of the plastic container by cement, solvent or ultrasonic bonding, to provide a positive seal to the contents of the container and to preclude any possibility for removal of the cap without removal of the tear band. When the cap is bonded in this fashion, the second or lowermost bead, previously described, need not be provided, since its function is obtained by the permanent bonding.

The mold of the invention is a multiple, integral cavity mold having special features to form a cap with an annular tear band and a dependent lateral tab located closely beneath the annular lip of the reclosure cap.

The annular lip is on the reclosure cap and serves as a grasping tab when removing and reseating the reclosure cap, after the tear band has been removed and the container has been opened. not bonded to the neck of the plastic container.

The cap of this invention is free of the problems which have plagued the press-on caps, particularly the absence of the center, corking skirt which has never achieved its intended purpose of sealing, but which instead has often hindered or obstructed the capping operation. There is no inner skirt and, hence, no interference with the compressive fit of the cap on the bottle neck. Surprisingly, it has been found that a sufficient compressive seal can be achieved with the foam gasket, albeit that the cap has radial beads with inclined side walls to permit its molding in injection molding equipment and to permit its ready removal and replacement onto the neck of a container. The foam gasket has an impervious lower skin or surface, and a metal foil can be applied to the undersurface of the plastic foam gasket. The gasket can also be bonded to the bottle neck by cement, solvent, or ultrasonic bonding. In a preferred molding method, the foam gasket is formed as an initial step in the injection molding followed by injection molding of the entire cap in a complete molding cycle.

BRIEF DESCRIPTION OF THE DRAWINGS

The invention will be described with reference to the drawings of which.

DETAILED DESCRIPTION OF THE INVENTION

When references are made to the accompanying drawings the similar characters of reference represent corresponding parts in each of the several figures.

Cap 1 is constructed in accordance with the present invention from a resilient and moderately flexible plastic substance that will deform slightly to snap on and snap off a container. Exemplary plastic materials which may be employed include polyethylene, polystyrene, polyvinyl chloride, polyacrylates, polyamides, polypropylene, etc. The preferred plastics are polyethylene and polystyrene.

Cap 1 has three main structural elements, a top disk 2, a single, downwardly dependent skirt 4, and a complete, or partial annual lip 3 about its upper portion 5. The top disk 2 is preferably a flat circular plate having a substantially planer exterior surface. The flat exterior surface provides a convenient place for labels or instructional material. While the disk can have a shape other than circular such as rectangular, oval, etc., the circular shape is preferred. The annular lip 3 extends beyond the skirt a slight distance to provide a convenient grasping tab for the removal of the upper portion 5 of the cap from the container once the tear band, described hereinafter, has been removed. As illustrated, lip 3 is discontinuous in the area 6, immediately above tear tab 14. A greater portion of lip 3 can be omitted, if desired, provided a sufficient area is present to permit one to lift up on the cap with one's fingers or thumb. Thus, the consumer, after removing the tear band from the cap, can open the container by applying pressure upwardly on the lip 3 by a thumb or finger. This section will unseat the upper bead from the upper groove and allow the cap to slide off the container neck in the manner described hereinafter.

The skirt 4 of cap 1 is integrally attached to the disk 2 and extends substantially perpendicularly from the undersurface of the disk. The skirt 4 is a thin-walled cylindrical shell and is composed of the thin shell, an upper score line 10, a lower score line 12, tear tab 14, and upper circumferential bead 16 and a lower circumferential bead 18, the latter shown and identified in FIG. 6.

The thickness of the skirt is not critical to the practice of this invention as long as the cap is sufficiently resilient to allow the internal beads 16 and 18 to expand over the wide areas of the container neck and snap into the container grooves without tearing the cap or container. Generally, however, the skirt thickness is governed by economics with the thinnest walled functional cap being preferred. Usually, the skirt will have a thickness ranging from 0.3 to 1.5 millimeters and more usually from 0.5 to 1.2 millimeters.

Figure 1:
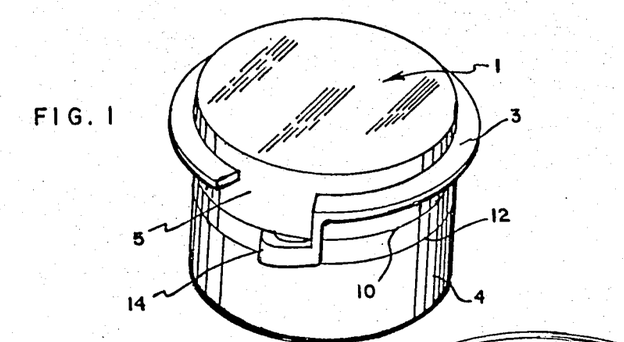
FIG. 1 is a perspective view of the press-on cap which can be used in the invention.
Figure 3:
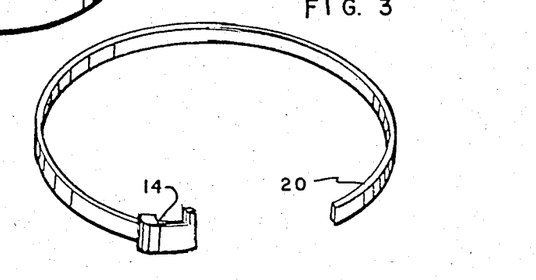
FIG. 3 is a perspective view of the tear band after its removal from the cap.

The upper score line 10 extends circumferentially about the skirt 4, about the outside of the skirt as shown in FIG. 1 for illustration purposes. The score line 10 however may also be made on the inner surface of the skirt and this is preferred as described hereafter. The lower score line 12 has the same shape and dimensions as the upper score line and is disposed at a lower position around the skirt. Like the upper score line 10, the lower score line 12 is shown in FIG. 1 on the outer surface of skirt 4, but preferably is on its inner surface. That portion of the skirt between score lines 10 and 12 constitutes tear band 20, as shown in FIG. 3. This tear band is removed when the consumer opens the container and, after it is removed from the cap, it can be discarded. Since it is to be discarded, it is preferable to make the band as narrow as possible without weakening the band to a point where it could break during removal. Generally the tear band will range in width from 2 to 10 millimeters.

A tear tab 14 can be attached to tear band 20 to provide a means for the user to grasp the tear band and tear it from the cap. The tear tab 14 may be any laterally projecting tab which permits the consumer to easily grasp it. In a preferred embodiment, the tab 14 extends laterally outwardly from the tear band 20 and then circumferentially, parallel to the band 20. Preferably, the tab 14 is of greater width then the band 20 for ease in grasping the tab and removing the tear band, and projects above the band 20 slightly, touching the undersurface of lip 3; see FIG. 3. The top edge of tear tab 14, preferably, is secured to the undersurface of lip 3 at a limited spot or area which is sufficient to maintain this tab 14 in position when the caps are fed through the chute of automatic capping machines and to guide the caps through the machine and onto the bottles. In order to increase the friction between the fingers and the tear tab, the tab is preferably provided with serrated grooves or the like.

Figure 2:
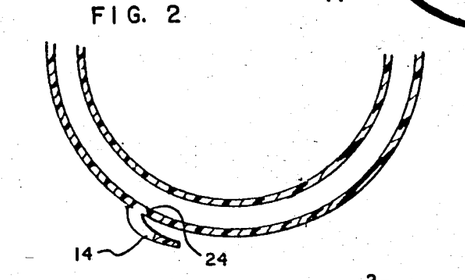
FIG. 2 is a view along lines 2—2 of FIG. 6.
Figures 4, 6:
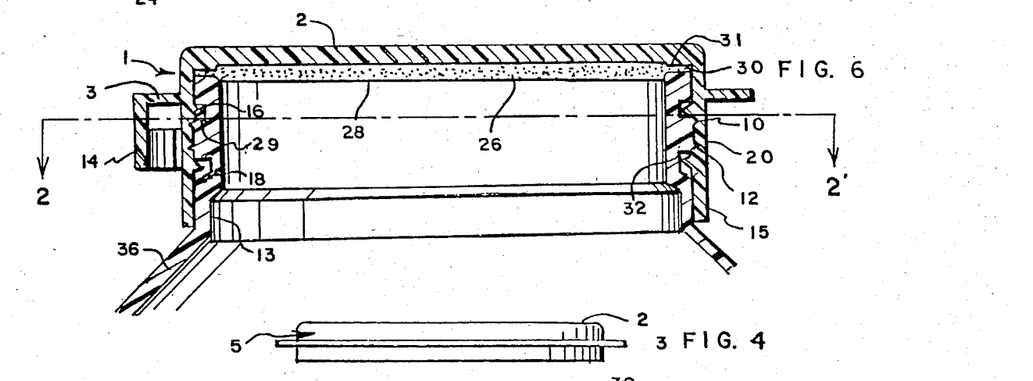
FIG. 4 is an elevational view of the top portion of the cap having the tear band and lower skirt removed.
FIG. 6 is a sectional elevational view of the cap of the invention on a container neck.

A weakened area or groove 24 (see FIG. 2) extends from the lower score 12 to the upper score line 10 substantially adjacent to tear tab 14. The weakened area is provided so that the tear band may be separated and torn free from the cap. Preferably, this weakened area is a score line 24 extending vertically between the two circumferential score lines 16 and 18. FIG. 3 shows the tear band 20 as it has been torn from the cap to permit removal of the upper cap portion 5. The latter is shown in FIG. 4 and constitutes a resealable reclosure cap which can be removed and reseated to the bottle neck as frequently as desired.

Figure 5:
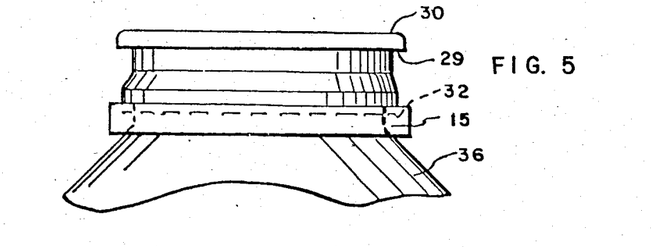
FIG. 5 is an elevational view of the lower skirt on a bottle after removal of the tear band and top portion of the cap.

FIG. 5 shows the bottle neck 13 with tear band 20 and upper cap portion 5 removed. The lower portion 15 of skirt 4 remains about the bottle neck. The neck finish 4 includes annular grooves 29 and 32 which receive, respectively, beads 16 and 18 of cap 1. Bead 16 is in the inside wall of upper cap portion 5 and functions by reseating in groove 29 of the bottle neck 13.

In the illustrated embodiment, upper and lower internal circumferential beads are provided around the interior of the outer skirt which fit into the grooves in the neck finish of the container and hold the cap firmly onto the container neck. These beads are shown in FIG. 6 seated in the bottle neck grooves. The upper head 16 is disposed above the first score line 10, between score line 10 and the undersurface of disk 2. The lower circumferential bead 18 is disposed below the second score line 12. The beads 16 and 18 are substantially uniform raised surfaces projecting inwardly from the skirt. The beads may be continuous about the entire periphery of the inner wall of skirt 4 or, alternatively, may be discontinuous. The cross-section of the bead can be semi-circular, however, it is preferably triangular with inclined sidewalls, as is shown in FIG. 6. The triangularity of these beads is preferred for ease in capping, removal and reapplication of the cap since the inclined surfaces of the triangular cross-sectional beads transmit axial force applied to the cap in an outward, radial direction thereby urging the grooves to seat or unseat from the grooves in the neck finish of the container. The inclined sidewalls also facilitate manufacture in ease of ejection of the caps from the molds used to fabricate the caps.

Figure 7:
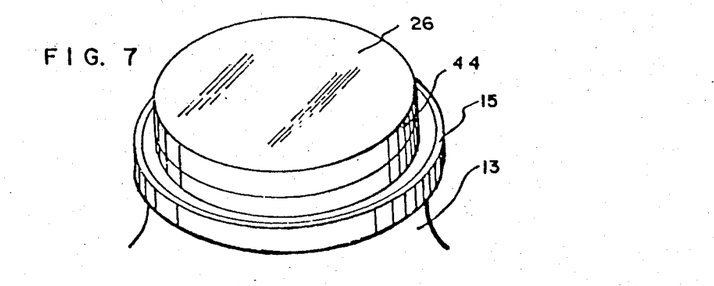
FIG. 7 is a perspective view of a bottle having a sealed gasket after removal of the tear band and upper cap.

Received within the cap is a compressible foam gasket 26 which is formed of suitable compressible plastic foam such as polyethylene, polyurethane, polystyrene, etc. Of these, polystyrene foam is preferred. The foam which is used is preferably of low density, e.g., about 0.5 to about 2 pounds per cubic foot and is of relatively thin, e.g., from about 0.1 to about 1 millimeter, preferably from about 0.1 to about 0.5 millimeter in thickness. Preferably the foam gasket 26 has an impervious undersurface. This can be achieved by a film coating 28 on the undersurface of foam gasket 26. While any relatively impermeable film can be used, such as polyethylene, polypropylene, polyvinyl chloride, etc., metal foil such as aluminum foil having a thickness from about 0.001 to about 0.005 inch, can be used. The gasket 26 can be formed during the formation of the cap, and for this purpose, a polyolefin liquid resin, which cures to a polyolefin foam can be injected into the mold cavity as a preliminary step to the injection molding of the caps. Once the polyolefin foam is injected and the foam gasket 26 is formed, the injection molding of the cap proceeds with the formation of a cap having a firmly bonded gasket 26 on its undersurface. Alternatively, the gasket 26 can be subsequently formed or bonded to the undersurface of the cap 26, either by bonding a preformed and precut gasket 26 or by applying the liquid polyolefin foaming resin into the previously formed cap. The gasket 26 can be used to provide a positive seal to the bottle contents. This is accomplished with the metal foil surfaced gasket by cementing or solvent bonding or ultrasonically welding the gasket to the upper edge 30 of the bottle neck. FIG. 7 illustrates a bottle having a positively sealed gasket 26 after removal of the tear band 20 and the upper cap portion 5. This construction requires the user to break or tear the gasket 26 to obtain the contents of the bottle.

As shown in FIG. 6, the cap when seated on the container with its circumferential beads 16 and 18 received within the annular grooves 29 and 32 of the neck finish of the container results in a compression applied to the foam gasket 26, thus insuring sealing of the contents of the container, even when the gasket isn't positively sealed to the bottle neck. For this purpose, the undersurface of cap 1 can have an annular, raised ring 31 about its periphery, immediately opposite the upper edge 30 of the neck of the bottle, thus providing a very positive compression on the gasket 26.

In a preferred application, the lower skirt portion 15 is bonded by cement or solvent, or welded by ultrasonic radiation, to the bottle neck 13. This provides a positive seal to the contents of the bottle and insures against tampering since the cap must be separated with the tear band to open the bottle. When the lower skirt portion 15 is permanently bonded to the bottle neck 13, the lower bead 18 can be deleted from the cap since the permanent bonding of the lower skirt portion serves most of the function of the lower bead. It is still preferred, however, to use both upper and lower beads 16 and 18, since the lower bead 18 is still useful in maintaining maximum sealing of the bottle neck against the foam gasket during the capping operation after the caps are placed on the bottles, but before the lower skirts of the caps are bonded to the bottle necks.

The cap 1 is primarily intended for use with a thin-walled plastic container 36. The container is usually fairly strong and lightweight. The shape of the lower portion of the container can be varied considerably as well understood in the plastic bottle art. As shown in FIG. 6, neck 13 projects upwardly from the main portion of the container and is an elongated, upwardly and inwardly shaped cylindrical thin-walled shell. At the upper end of neck 13 are the two peripherally disposed circumferential grooves 29 and 32. A cylindrical shell 44 extends up from the upper groove 29 and terminates, in a preferred embodiment, in a smooth rounded container edge 30. The lower groove 32 is disposed so that it can receive bead 18 of the cap 1 when the cap is inserted into the container. The circumferential grooves 29 and 32 may be triangular, circular, or rectangular, such as shown.

In using the cap in the combination of the cap and gasket of this invention, the container is filled with a product and the cap is installed in automated capping machinery. The skirt 4 of cap 1 is slipped over neck 13 and a downward pressure is applied. The top edge 30 of the container neck is forced upwardly against the undersurface of the foam gasket 26 and as the downward pressure is continued, compressively seats against the outer peripheral undersurface of the foam gasket. The beads 16 and 18 also slide over the surface of the neck 38 and snap into grooves 29 and 32. Because of the flexible nature of the plastic material from which the cap is fabricated, a temporary elastic deformation of the cap is experienced, permitting its placement on the neck in the described manner. When assembled, the container is sealed since the upper edge 30 bears tightly against the foam gasket 26 and this compression is aided by the annular ring 31 of cap 1. This sealing is effected regardless of variation or tolerances in manufacturing of the cap or of the neck finish of the container as there is no reliance placed on the closeness in fit between these elements. Instead, the sealing is effected by the compression of the foam gasket 26 and the distance of the compression of this member is greater than any reasonable tolerances in the manufacture of the cap and neck finish of the container.

As previously mentioned, a positive seal and tamperproof construction can be provided by bonding gasket 26 to the top edge 30, or by bonding the lowermost portion of the skirt to the outer wall of the bottle neck. Although cement or solvent bonding can be used, it is preferred to use ultrasonic bonding in which the plastic cap is bonded, without the use of cements or adhesives. This is accomplished using commercially available equipment at a bonding station which is added to the capping line through which the capped bottles are passed. At this station, the upper portion of the cap can be surrounded by the ultrasonic generator to bond the gasket to the upper end of the plastic neck of the container, or the lower portion of the cap can be surrounded by a split collar ultrasonic generator to bond the lowermost portion of the cap skirt to the bottle neck.

When the consumer wishes to open the container, he grips the tear tab 14 and pulls outwardly, tearing the tear band from the skirt 4. The lower portion 15 of the skirt 4 remains as a ring on the container, completely severed from cap 1. The portion of the cap above the tear band comprises a reclosure cap 5 for the container. The reclosure cap may be pried off by lifting on the lip 3. The closing of the cap on the container will also compress the foam gasket 26 and it has been found that the cap is sufficiently resilient that the cap can be seated with the upper bead 16 received in the annular groove 29 while exerting a compressive force or sealing force against the foam gasket 26. Lip 3 of the reclosure cap 5 is formed sufficiently thin that it will deflect and release the lifting pressure when attempts are made to remove the cap without first removing the tear band 20. The lip 3 has a sufficient thickness, however, to permit one to lift the reclosure cap 5 after the tear band has been removed, and only the top bead 16 secures the cap 5. The necessary thickness for this will be from 0.3 to about 1.5 millimeters, preferably from about 0.5 to 1.2 millimeters for low density polyethylene, the preferred cap material.

An advantage of the cap of this invention is that it can be used with glass containers which lack the necessary precision in neck wall thickness to be used with the conventional caps having center corking skirts. Since the cap of this invention does not employ a center skirt, it can accommodate containers of varied neck wall thicknesses. The cap of the invention seats on to the outside of the container neck and common manufacturing of glass bottles and containers provides adequate precision in these dimensions for seating of the cap. Variation in neck wall thickess has no affect on seating of the cap since it has no center corking skirt which must be received within the container neck when the cap is seated. Since the container is sealed with its upper neck edge 30 compressed against the cap gasket 26, variation in the neck wall thickness also has no affect of this sealing. The gasket can also be sealed to the neck of glass containers, using conventional heat sealing coatings which can be applied to the upper end of the glass neck by the container manufacaut­rer. A similar coating can be applied to the undersurface of the gasket, and after the cap has been seated, the closed container can be passed to a heating station where the cap is heated sufficiently to seal the gasket to the bottle neck, thus achieving a positive seal to the container contents, even with a glass container. The same technique can, of course, be used with a plastic container.

Figure 8:
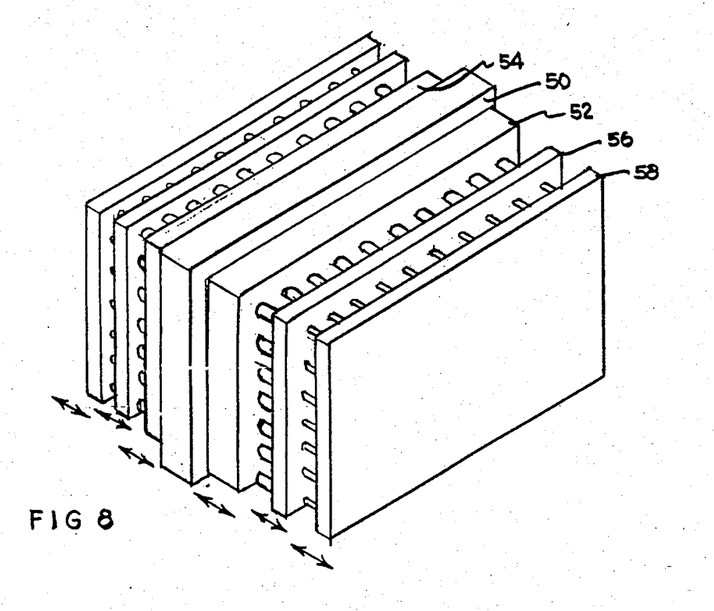
FIG. 8 is a perspective view of a stacked mold used in the invention.

Referring now to FIG. 8, the mold and its operation for the production of the caps of his invention will be described. The caps are preferably made by injection molding and the mold described hereinafter is intended for this manufacturing method. As illustrated in FIG. 8, the preferred mold is of the construction known in the industry as a stacked mold in which a stationary center die plate 50 is used with movable, outer die plates 52 and 54. Each assembly of outer die plates includes independently movable core plates such as 56 and runner plates such as 58. A plurality of runners or pins 60 project inwardly from runner plate 58 and a plurality of cores 62 also project inwardly farom core plate 56, concentric with runners 60.

Figure 9:
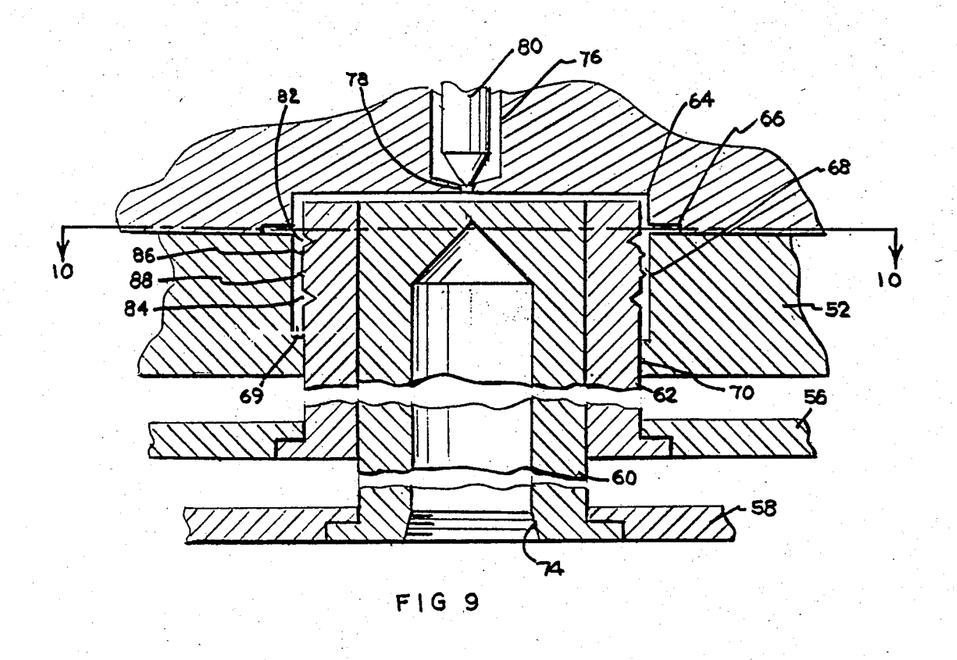
FIG. 9 is a view along line 9—9 of FIG. 8.

The construction and operation of the mold of the invention will be more apparent from the illustration of FIG. 9, a sectional view through a single mold cavity. The center die plate 50 is shown with a cylindrical recess 64 and a surrounding annular recess 68. The cylindrical recess 64 corresponds in depth to the height of the reclosure cap above its annular lip 3 and the annular groove 66 corresponds in width and thickness to the lip 3 of the cap. This recess is coaxial with a cylindrical bore 68 in the outer die plate 52 which has a depth corresponding to the width of the skirt 4 of the cap beneath its lip 3.

The bore 68 in the outer cavity plate 52 has a mating or coacting cylindrical recess 68 in the form of a bore that is counterbored at a lesser diameter at 70. The counterbore 70 receives the cylindrical core 62 which, as previously mentioned, is dependent on core plate 56.

Core 62 has a central through bore 72 which receives the runner 60 that depends from runner plate 58. The latter has a center bore 74 which can be threaded as shown for connection of hydraulic lines for operation.

Core 62, at preselected locations, is provided with upper annular groove 82 and lower annular groove 84. These grooves form the annular beads 16 and 18, respectively, of cap 1. These grooves can be discontinuous to provide discontinuous beads about the periphery of inside wall of cap 1 or can be continuous, as desired.

As previously mentioned, upper and lower score lines are molded into the cap to provide an annular tear band. Although FIG. 1 shows the score lines on the outer periphery of skirt 4, it is preferred to form the upper and lower score lines on the inside wall of the skirt 4. This is provided in the mold by the annular beads 86 and 88 which are located on core 62, between the upper annular groove 82 and lower annular groove 84. These beads 86 and 88 extend into the annulus 69 between the core and cylindrical recess 68 of the outer mold plate 52. Location of the score lines on the inside wall of the cap 1 thus permits the manufacturer to avoid split-cavity molds.

Molten polymer is injected into the die cavity 65 through passageways of the stationary die plate 50. This is illustrated in FIG. 9 by the small orifice 78 which communicates between the mold cavity 65 and passageway 76. Flow through this passageway is controlled by valve member 80 which is operative to open and close orifice 78 at preselected times during the molding cycle.

Figure 10:
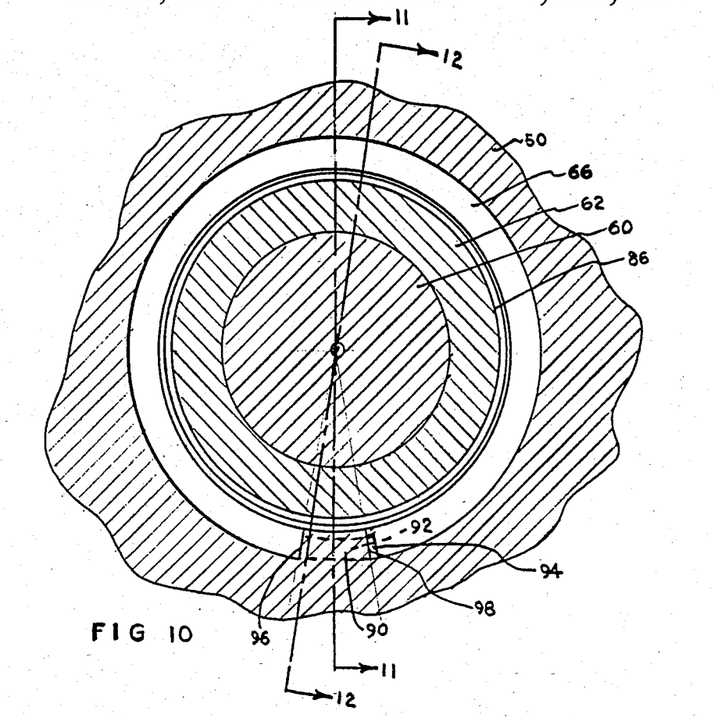
FIG. 10 is a view along line 10—10 of FIG. 9.

FIG. 10 shows a sectional view along lines 10—10 of FIG. 9. As previously mentioned, cylindrical recess 64 in plate 52 is surrounded by an annular groove 66. The upper end of core 62 is concentrically received within the cylindrical recess 64 providing the annular cavity 69 of the mold. The annular bead 86 extends into, but not entirely across this cavity 69 and core 62 has annular grooves 86 and 88.

Preferably, the annular groove 66 is discontinuous, most preferably for a short distance, between walls 96 and 98 thereby forming a solid web 90 that extends into contact with the outer cavity plate 52. Immediately beneath this web 90, the outer cavity plate 52 has an arcuate cavity 92 with a width slightly less than the width of the annular recess 66 and a length substantially equal to the length of web 90. This annular recess, however, is slightly offset from web 90 by a slight distance 94 which can be from about 1/16 to about ¼ inch.

Figure 11:
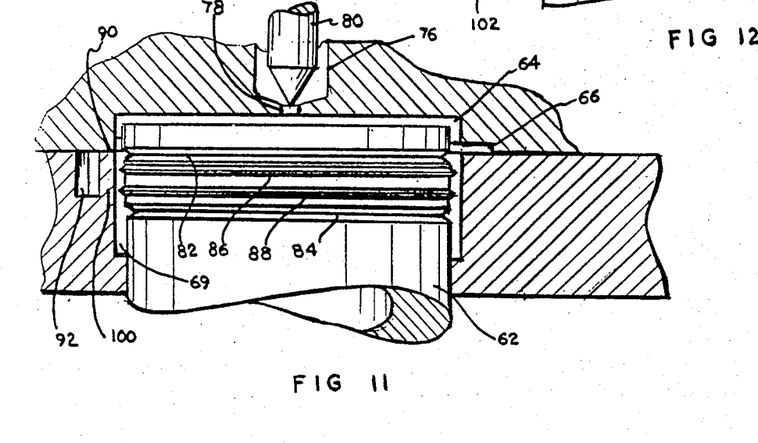
FIG. 11 is a view along line 11—11 of FIG. 10.

The configuration of the cavity 92 is more apparent from FIG. 11, which is an elevational sectional view along lines 11—11 of FIG. 10. This shows the web portion 90 of stationary cavity plate 50 meeting the outer cavity plate 52. Cavity 92 is recessed into outer cavity plate 52, offset from the bore 66 a slight distance to provide the intermediate wall 100 that extends upwardly to abut the undersurface of web 90 of stationary mold plate 50. The cavity 92 forms the tear tab 14 of cap 1.

Figure 12:
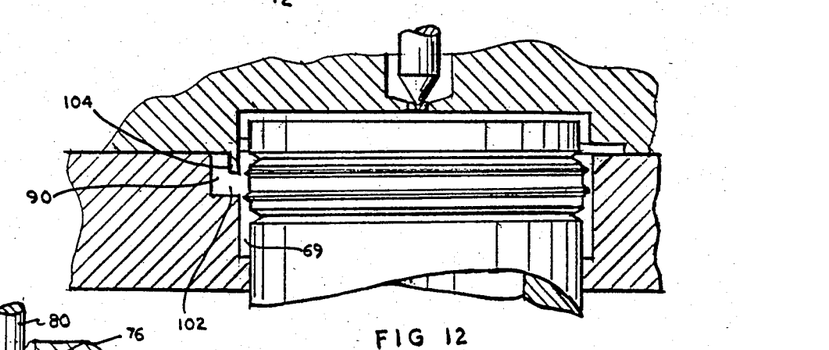
FIG. 12 is a view along line 12—12 of FIG. 10.

As previously mentioned, the tear tab 14, which is formed in cavity 92, is of greater width than the tear band 12. At its leading edge the tear band 14 is integrally formed with the tear band and cap 1. FIG. 12 illustrates an elevational sectional view of the mold cavity at the point where the tear band is integrally formed with the cap. As there illustrated, the intermediate wall 100 (shown in FIG. 11) is open to provide a passageway 102 communicating between cavity 92 and the annular cavity 69. The stationary mold plate 50, however, has a tab 104 that projects into opening 102, reducing the width of this opening to correspond to the width of the tear band 12, i.e., the distance between the two spaced-apart beads 86 and 88 on the core 62.

As previously mentioned, the tear tab 14 is preferably formed with its trailing end tacked to the undersurface of the annular lip 3. This is accomplished in the mold configuration by the short overlap of annular recess 66 in stationary mold plate 50 and the short arcuate recess 92 in the outer mold cavity plate 52, see FIG. 10. This slight overlap forms an open communication 94 between these cavities such that when used, the molten plastic will integrally bridge between lip 3 and the trailing end of tear tab 14.

In operation, the outer cavity plates 52 are pressed against the opposite faces of the stationary mold plate 50 and the cores 62 are fully advanced into the outer mold plates 52 by compression of the core plates 56. The runners 60 are located at their position shown in FIG. 9 with their end surfaces flush with the surrounding ends of cores 62. The mold plate 50 which has been preheated with suitable heating means such as electrical conductors and the like is supplied with molten molding resin such as low density polyethylene through a supply conduit, not shown. Passageways internal of the mold plate 52 communicate with the mold feeder passageways 76 to supply the molding resin at a high pressure, e.g., 2000 to about 3500 psig, to the mold cavity. In the preferred molding method, the liquid polyolefin foaming resin for the formation of the foam gasket 26 is first injected and permitted to cure and then the molding resin for the cap is injected. The molding resin is injected into the mold cavity by retraction of the valve member 80. When the cavity is filled, valve member 80 closes. The mold plates 50 and 52 are cooled sufficiently about the mold cavity by heat exchange with a cooling fluid so that the moltent plastic gels after it is injected into the mold cavity. For this purpose, plates 50 and 52 have internal passageways, not shown, for circulation of a heat exchange fluid. Once the plastic within mold cavity 65 gels and begins to solidify, the plates 52, 56 and 58 are retracted from stationary plate 50. The outer cavity plate 52 is also retracted from its position relative to core 62, leaving formed caps on the ends of each of the cores 62. Once the outer cavity plate 52 has cleared the lower ends of the caps formed on the cores 62, the runners 60 are moved forward, past the ends of the cores 62, lifting the formed caps from their cores 62. Although the invention has been illustrated with reference to mechanically actuated runners 60 for ejection of the molded caps, this function can equally be accomplished by discharging a compressed fluid such as compressed air through valve passageways in cores 62 when it is desired to eject these caps.

The caps of the invention are thus capable of manufacture without the use of split-cavity molds, i.e., cavities split along the longitudinal axis of the mold cavity. The caps, however, are provided with annular lips 3 and immediately subjacent tear bands 20 having dependent, laterally projecting tear tabs 14. The tear tabs preferably have a greater width that the annular tear bands to provide a sufficient surface for grasping by the user, and this construction provides for a minimal width of the tear band 12. The cap of this design thus provides reclosure caps 5 and annular skirts 4 of maximum height. Since the annular lips 3 are located substantially across from the inner beads 16 of the reclosure cap, these lips are at their most effective position for removal of the closure caps with the application of an upward pressure. Additionally, the location of the annular lips at this position permits the tear tabs 14 to be tacked to the lips at their trailing end, a construction which insures that the caps will feed smoothly through cap chutes and conveyors of the recapping machine.

The invention has been described to the illustrated and presently preferred embodiments. It is not intended that the invention be unduly limited by this disclosure of preferred embodiments. Instead, it is intended that the invention be defined by the means, and their obvious equivalents, set forth in the following claims.

What is claimed is:

1. In a sealed container having a neck with a neck finish comprising annular groove means about its outer wall and a snap-on plastic cap cooperatively seated on said neck with a top disc and a skirt downwardly dependent from the peripheral edge of said disc and received over said neck and having annular bead means with inclined sidewalls projecting inwardly from the inside wall of said skirt seated in said annular groove means, the improvement comprising: two, spaced-apart score lines located beneath said annular bead means, forming a weakened tear band between said two score lines, a tear tab laterally extending from said weakened tear band, and a discontinuous annular lip located axially intermediate said top disc and said score lines, immediately axially above said tear tab and extending about a portion of the outer periphery of said skirt opposite said annular bead means with a discontinuous portion immediately above said tear tab.

2. The sealed container of claim 1 wherein said lip is spaced a slight axial distance above the upper of said score lines and said tab has a trailing portion which extends circumferentially parallel to said tear band, and said tab portion has a width greater than the width of said tear band and extends upwardly into integral connection to said lip.

3. The sealed container of claim 1 including a sealing gasket of compressible plastic foam having an impermeable undersurface received within said skirt and bearing against and covering substantially the entire unbroken undersurface of said disc.

4. The sealed container of claim 3 wherein said foam gasket has a metal foil on its undersurface.

5. The sealed container of claim 3 wherein said foam gasket is polystyrene foam having a thickness from about 0.1 to about 1.0 millimeters.

6. The second container of claim 3 wherein the lowermost portion of said skirt, beneath said lowermost score line is permanently bonded to the neck of said container.

7. The press-on cap of claim 6 wherein said lip is integral with said trailing portion of said tear tab.

8. The sealed container of claim 1 wherein said container is a blow-molded plastic container.

9. The sealed container of claim 3 wherein said gasket is permanently bonded to the upper edge of the neck of said container.

10. The container of claim 1 wherein said annular groove means comprises at least two spaced-apart annular grooves and wherein said annular bead means comprises an equal number of annular beads with one of each said annular beads seated in a respective one of said annular grooves.

11. The sealed container of claim 10 wherein said annular beads have a triangular cross-section.

12. The sealed container of claim 11 wherein said annular beads are discontinuous about the inner periphery of said skirt.

13. The container of claim 1 wherein said disc of said cap has a substantially smooth, unbroken undersurface, with a compressible plastic gasket having an impermeable undersurface received against said undersurface of said disk and having its outer peripheral surface engaged by the annular edge of said neck, with said annular groove means and bead means axially spaced on their respective neck and skirt to cause said annular edges of said neck to compress the engaged surface of said compressible plastic gasket when said cap is seated on said neck and thereby effect sealing of the contents of said container.

14. A press-on cap for a liquid container which comprises:
 (a) a disc having a smooth, unbroken undersurface;
 (b) a single, downwardly dependent right cylindrical skirt integrally projecting from the peripheral edge of said disc;
 (c) two annular beads with inclined sidewalls integrally projecting inwardly from the inside wall of said skirt and axially spaced apart thereon;
 (d) two, spaced-apart score lines located between said two annular beads forming a weakened tear band therebetween and including a tear tab laterally extending from said weakened tear band; and
 (e) a discontinuous annular lip about a portion of the of said cap, immediately axially above said tear tab, extending outwardly of said skirt with a discontinuous portion immediately above said tear tab.

15. The press-on cap of claim 14 including a sealing gasket of compressible plastic foam having an impermeable undersurface received within said skirt and bearing against and covering substantially the entire unbroken undersurface of said disc.

16. A sealed container having a neck with a neck finish comprising at least one annular groove about its outer wall and a snap-on plastic cap cooperatively seated on said neck with a top disc and a skirt received over said neck and having at least one annular bead with inclined sidewalls projecting inwardly from the inside wall of said skirt, at a vertical position to coact with said annular groove, a substantially smooth unbroken surface with a raised annular ring about its periphery on the undersurface of said disc, a compressible plastic gasket having an impermeable undersurface received against said undersurface of said disk with its outer peripheral surface engaged between the raised ring on the undersurface of said disc and the annular edge of said neck, with said annular groove and bead axially spaced on their respective neck and skirt such that when said bead is seated in a respective groove, said annular edge of said neck compresses the engaged surface of said compressible plastic gasket thereby effecting sealing of the contents of said container, two, spaced-apart score lines located beneath said bead forming a weakened tear band therebetween, a tear tab extending laterally outwardly from said weakened tear band, an annular lip about at least a portion of said cap skirt at an axial location thereon which is beneath said top disc and above said score lines, immediately axially above said tear tab, and a permanent bond between the neck of said container and the inside wall of said skirt beneath the lower of said annular score lines.

17. The sealed container of claim 16 wherein said lip is discontinuous about the periphery of said cap with an open portion immediately above said tear tab, and wherein said lip is integral with said tear tab.

18. The sealed container of claim 16 wherein said annular bead has a triangular cross-section.

19. The sealed container of claim 16 wherein said annular bead is continuous about the inner periphery of said skirt.

20. The sealed container of claim 16 wherein said compressible plastic gasket is polystyrene foam having a thickness from about 0.1 to about 1.0 millimeters.

21. The sealed container of claim 16 wherein said gasket is permanently bonded to the upper edge of the neck of said bottle.

22. The press-on cap of claim 16 wherein said container has at least two spaced-apart annular grooves and said cap has an equal number of annular beads about its inside wall with one each seated in a respective one of said annular grooves.

23. The press-on cap of claim 22 wherein said score lines are located between said two, spaced-apart beads and said lip is located opposite the uppermost of said two beads.

* * * * *